US007129808B2

(12) United States Patent
Roebke et al.

(10) Patent No.: US 7,129,808 B2
(45) Date of Patent: Oct. 31, 2006

(54) CORE COOLING FOR ELECTRICAL COMPONENTS

(75) Inventors: Timothy A. Roebke, Milwaukee, WI (US); Scott D. Day, Richfield, WI (US); Steven C. Kaishian, Wauwatosa, WI (US); William K. Siebert, West Bend, WI (US); Dennis L. Kehl, Benton Harbor, MI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 33 days.

(21) Appl. No.: 10/932,244

(22) Filed: Sep. 1, 2004

(65) Prior Publication Data

US 2006/0044103 A1 Mar. 2, 2006

(51) Int. Cl.
*H01F 27/08* (2006.01)
*H02B 1/00* (2006.01)

(52) U.S. Cl. .......................... 336/55; 336/208; 336/57; 336/60; 361/676; 361/699

(58) Field of Classification Search ................ 336/198, 336/208, 192, 55, 57–62; 361/676, 677, 361/699, 618, 620
See application file for complete search history.

(56) References Cited

U.S. PATENT DOCUMENTS 3,144,627 A 8/1964 Dunnabeck et al.
3,823,296 A * 7/1974 Amagami et al. .......... 219/668
4,482,879 A 11/1984 Jackowicz
4,739,825 A 4/1988 Van Dusen et al.
4,897,627 A * 1/1990 Van Wagener et al. ....... 336/65
4,902,998 A 2/1990 Pollard
4,956,626 A 9/1990 Hoppe et al.
5,380,956 A 1/1995 Loo et al.
5,466,052 A * 11/1995 Tietje ............................ 303/1
6,051,822 A * 4/2000 Bruckner et al. ........... 219/632
6,157,282 A 12/2000 Hopkinson
6,501,653 B1 12/2002 Landsgestell et al.
6,661,327 B1 12/2003 Funk

FOREIGN PATENT DOCUMENTS

BE 552 492 A 12/1959
EP 1 175 135 A1 1/2002
EP 1 564 762 A2 8/2005
EP 1 592 028 A 11/2005
JP 02001286118 A 10/2001
JP 2001286118 A * 10/2001

* cited by examiner

*Primary Examiner*—Anh Mai
(74) *Attorney, Agent, or Firm*—Keith M. Baxter; William R. Walbrun

(57) ABSTRACT

A cooling system is provided for electrical components in which cooling assemblies (11, 45) are inserted in non-magnetic cores of the electrical components, and in which tubes provide both inflow and outflow of a cooling medium. The non-magnetic cores may be bobbins (30) for an inductor assembly or the core of a capacitor (40). The tubes may form a loop (11) in more than one plane to prevent inducing current in a single turn, or they may be split-flow closed-end tubes (45) inserted from one end of the electrical component. The bobbin cores (31) are also constructed with a non-conductive portion to prevent inducing a current in a single turn of a conductor.

16 Claims, 14 Drawing Sheets

CORE COOLING FOR ELECTRICAL COMPONENTS

CROSS-REFERENCE TO RELATED APPLICATIONS

Not Applicable

Statement Regarding Federally Sponsored Research

Not Applicable

1. Technical Field

The field of the invention is cooling systems and methods for electrical control equipment and components.

2. Background Art

Recent developments in hybrid vehicles and defense applications have increased the demand for cooling systems for electrical control equipment and components.

The cooling of electrical components lowers their temperature of operation and increases their electrical efficiency and power output per unit size. Electrical resistance, for example, increases with heating and causes the equipment to be less efficient. The size and weight of electrical components can be reduced for a given power rating, provided that operating temperatures are kept within a certain range of ambient temperature by the use of cooling systems.

It is typical to mount electrical controls in enclosures. Cooling of the electrical equipment is also beneficial in that removes heat from such enclosures and in some cases allows for sealed enclosures.

One category of electrical components includes inductors which are electromagnetic devices having an electromagnetic core, often made of ferromagnetic metal, and coils with many turns of electrical wire. These include transformer, choke coils and many other devices using such electromagnetic components.

In the prior art, many solutions to cooling such devices have included air cooling with radiating fins attached to the components. Traditional, air-cooled inductors are volumetrically inefficient. Large surface areas are required to reject the heat. These components are large in size and have significant weight. Sealed boxes containing inductors of considerable size cannot be adequately air-cooled.

In liquid cooled devices, several approaches have been used. Sometimes tubes have been wrapped around the cores with the wiring for the coils. In some cases, the coils have been immersed in liquids within their enclosures.

In any approach care must be taken not to short the turns of the coil or to reduce the inductance or other electrical properties of the component due to the addition of the cooling system.

SUMMARY OF THE INVENTION

A cooling system is provided for electrical components in which passageways are provided in non-magnetic cores of the electrical components, and in which the passageways provide both inflow and outflow of a cooling medium. The non-magnetic cores may be bobbins for an inductor assembly or the core of a capacitor. The passageways may be contained within tubes may form a loop in more than one plane to prevent inducing current in a single turn, or they may be split-flow closed-end tubes inserted from one end of the electrical component.

In the prior art it has been typical either to provide conduits running through the magnetic core or to provide conduits around the coils of an inductor assembly.

In one embodiment, the invention provides a bobbin core of non-magnetic material having a central opening therethrough and having two portions spaced apart to form a gap and a bobbin member disposed over the core, the bobbin member being made of a dielectric material. An electrical component is disposed over the bobbin member and a pair of end pieces of dielectric material are disposed on opposing ends of the electrical component and extend parallel the electrical component. Holes extend into the end pieces and into the bobbin core extending into the core in a direction normal to the electrical component. These holes are adapted to accept tubes for a cooling medium are and for circulating the cooling medium within the bobbin core to cool the electrical component.

Cooling conduits are further arranged to run through the bobbin in a direction perpendicular to the coils to minimize possible negative effects on the electrical properties of the coils. These conduits can either terminate in the bobbin or continue through the bobbin to form a loop in more than one plane. The possibility of inducing a current in a single turn of a coil positioned in one plane is avoided. In addition, the conduit assembly for the cooling system can be shielded from the coil windings by dielectric end plates. The conduit assembly also minimizes the number of transverse portions in preference for portions that are in a direction perpendicular to the coils.

With this approach the turns of the coils are not susceptible to shorting or diminution of their electrical properties of the component due to the addition of the cooling system.

The bobbin assemblies can also use a construction that provides an air gap between two half sections of the bobbin core.

The present invention allows the liquid-cooled inductors to be smaller and of less weight. It also minimizes internal heating of a closed container. It allows redirection of heat energy outside of the system to a desired heat exchanging location.

The invention will produce lower electrical losses than an equivalent air-cooled design, due to decreased heating.

The invention will lower the internal temperature of any electrical equipment enclosure, thus demanding less air stirring and exhaust without the excess heat of the inductor. It may also allow the use of lower-temperature components within the enclosure.

The invention will lower the losses due to heat, reduce internal enclosure temperature, reduce the size of fans that remove heat and other electrical components, and will allow for lower temperature rated components The invention will reduce the heat load of internal devices upon the “thermal rejection” system.

The invention will provide smaller inductors, due to increased allowable flux density, so that smaller cores and smaller coils can be used.

The invention will be a smaller device, which reduces shipping weight, required package structural strength, and material mass. All of these factors translate to decreased cost.

The invention will allow for the packaging of this inductor into applications (environments) where air-cooled inductors are not possible.

The invention is also applicable to other electrical components such as capacitors.

These and other objects and advantages of the invention will be apparent from the description that follows and from the drawings which illustrate embodiments of the invention, and which are incorporated herein by reference.

DETAILED DESCRIPTION

Figure 1:
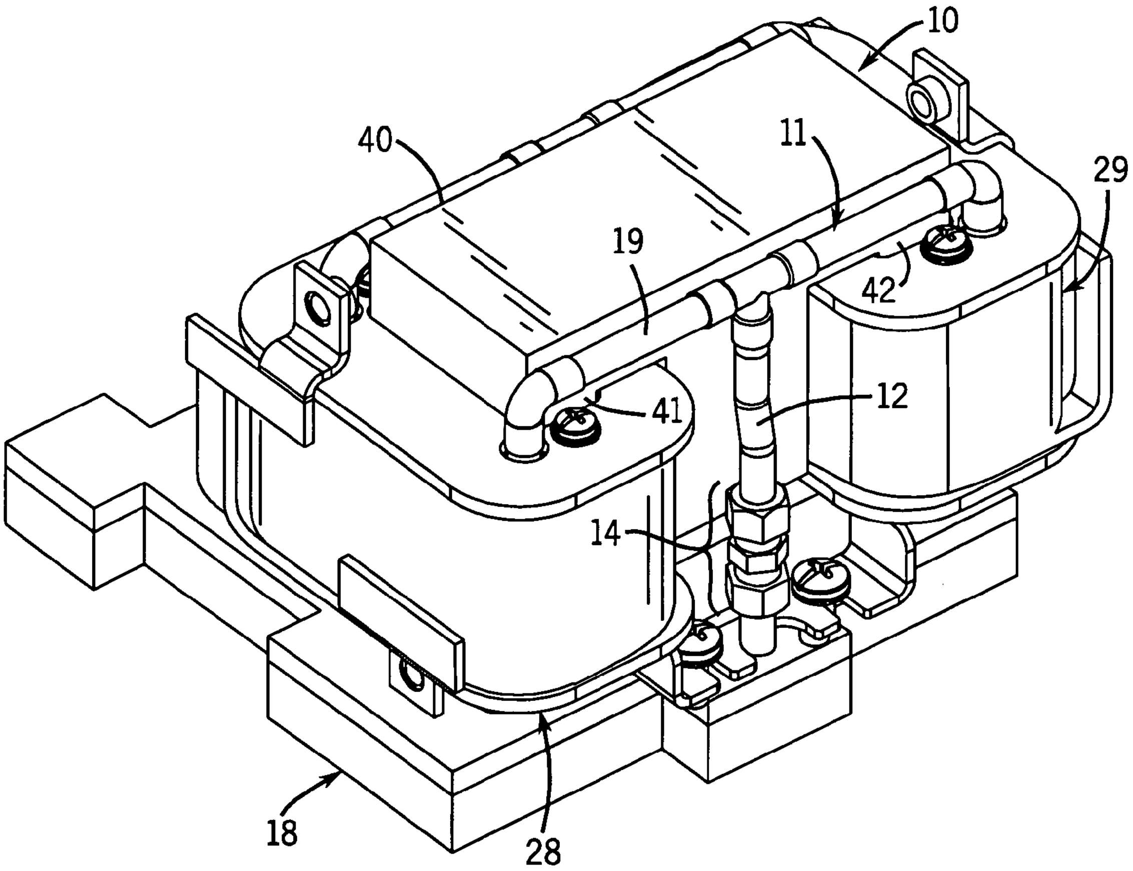
FIG. 1 is a front perspective view of the inductor assembly of the present invention assembled to a cooling plate.
Figure 2:
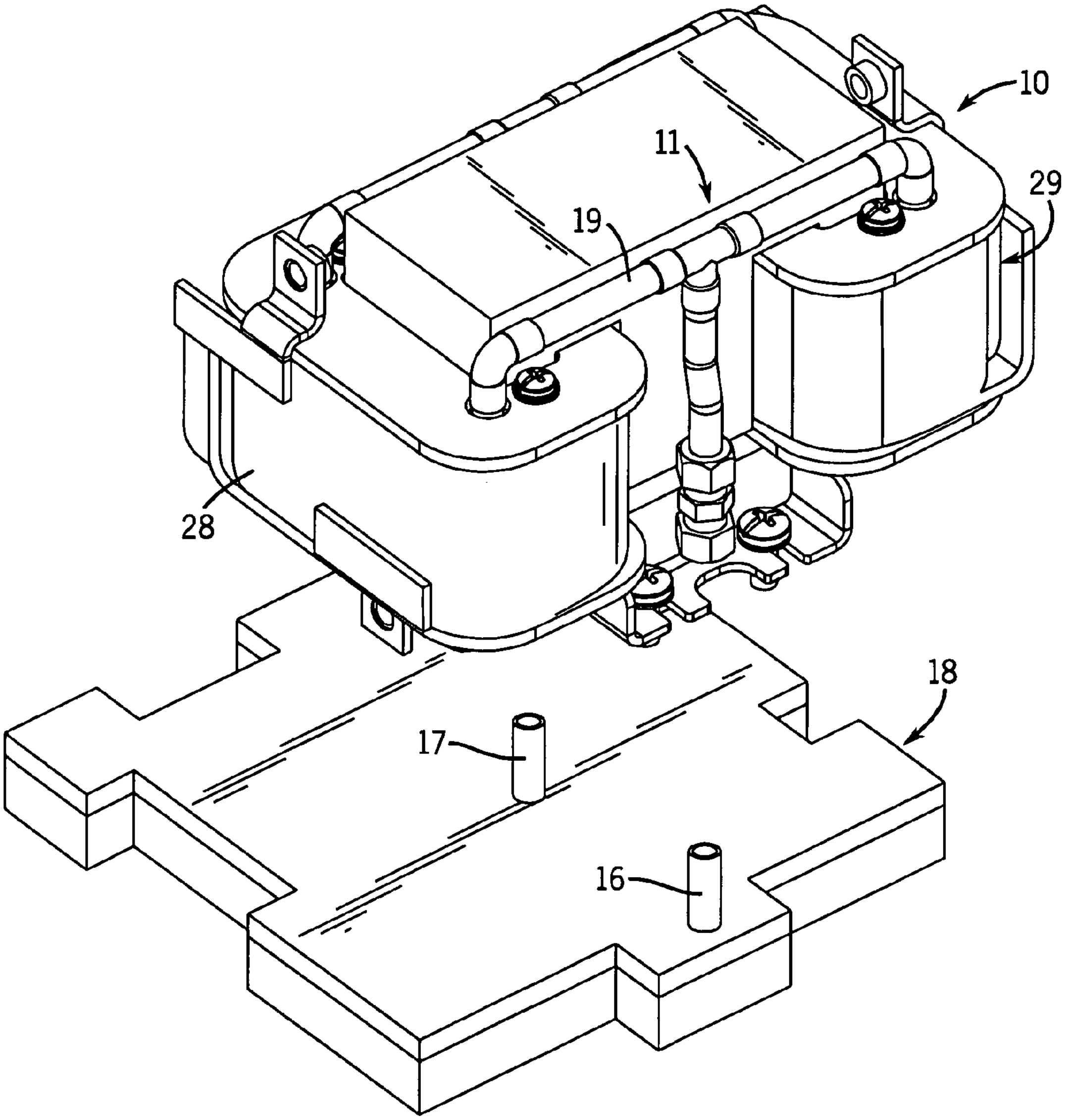
FIG. 2 is a partially exploded view of FIG. 1.
Figure 3:
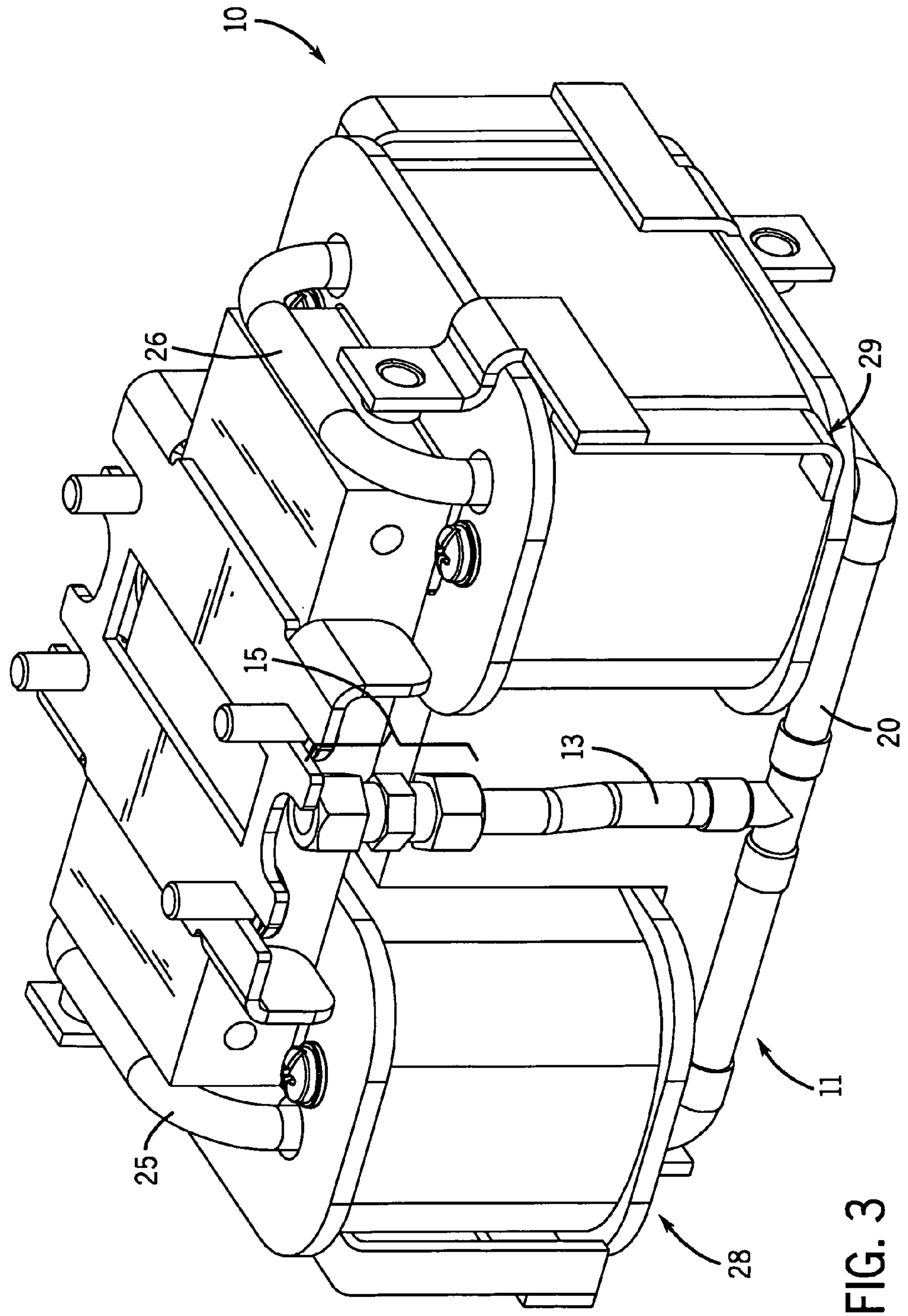
FIG. 3 is a bottom perspective view of the inductor assembly with a cooling system as seen in FIG. 2.

FIG. 1 illustrates an inductor assembly 10, which is a choke coil assembly, and which is constructed according to the present invention. The choke coil assembly 10 has a conduit assembly 11 for circulating a cooling fluid. As seen in FIGS. 1–3, the conduit assembly 11 is connected by vertical feed conduits 12 and 13 and couplings 14, 15 to conduit stubs 16, 17 in a cooling base plate 18. This base plate 18 has hollow portions for conveying the cooling fluid into and out of the conduit assembly 11 associated with the choke coil assembly 10. As seen in FIG. 1–3, the conduit assembly 11 forms a loop in three planes with two horizontal transverse runs 19, 20 across the top, four vertical runs 21, 22, 23 and 24 through the coil assemblies 28, 29 and two horizontal front-to-back runs 25 and 26 across the bottom which run at right angles to the top transverse runs 19 and 20.

The conduit assembly 11 is referred to as a "pass-through" type of conduit assembly because its conduit tubes allow cooling fluid to pass completely through the coil assemblies 28, 29 from an inlet to an outlet, and the conduit assembly forms a complete circuit passing through the coil assemblies 28, 29.

Figure 4:
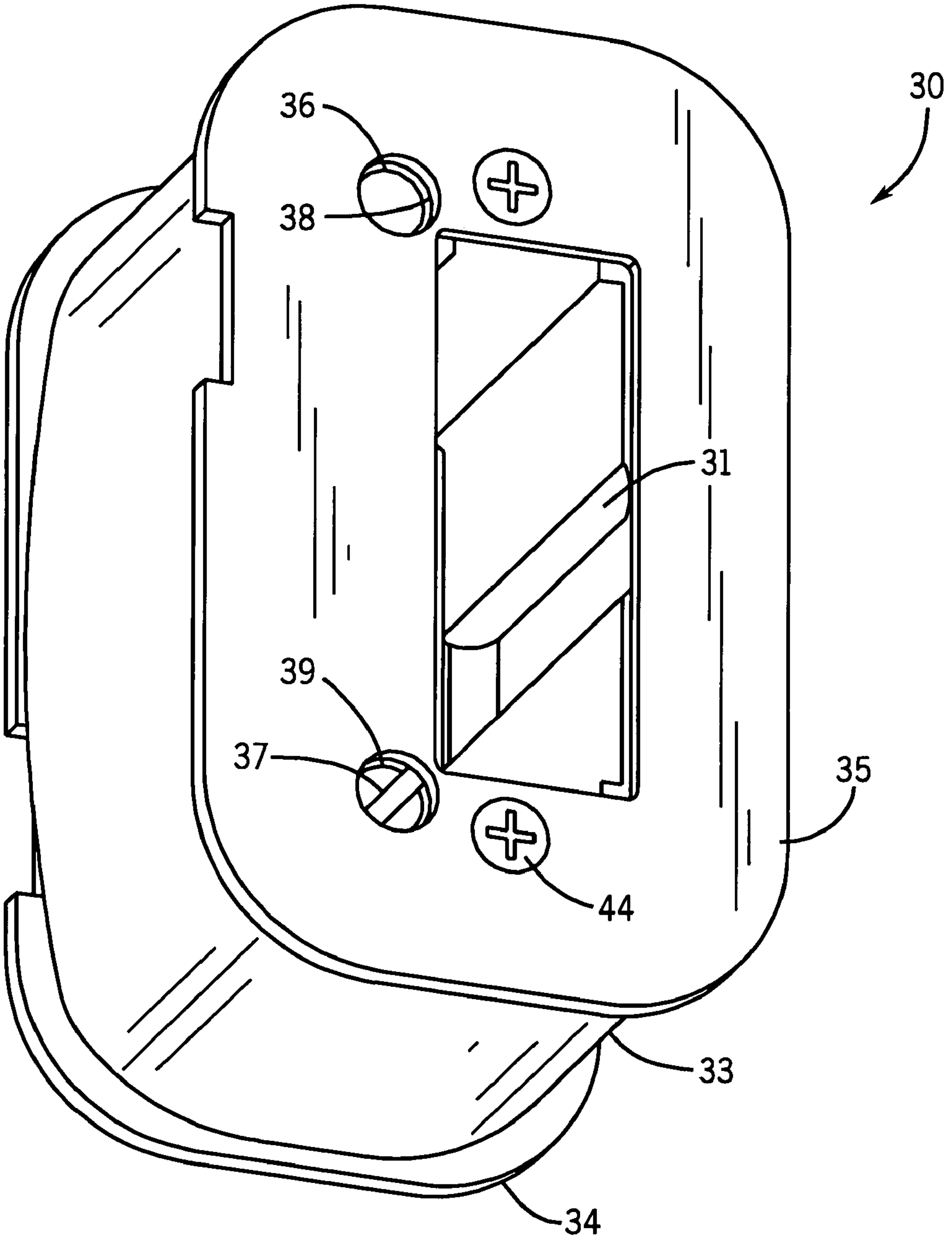
FIG. 4 is a bottom perspective view of an individual bobbin assembly of the present invention.
Figure 5:
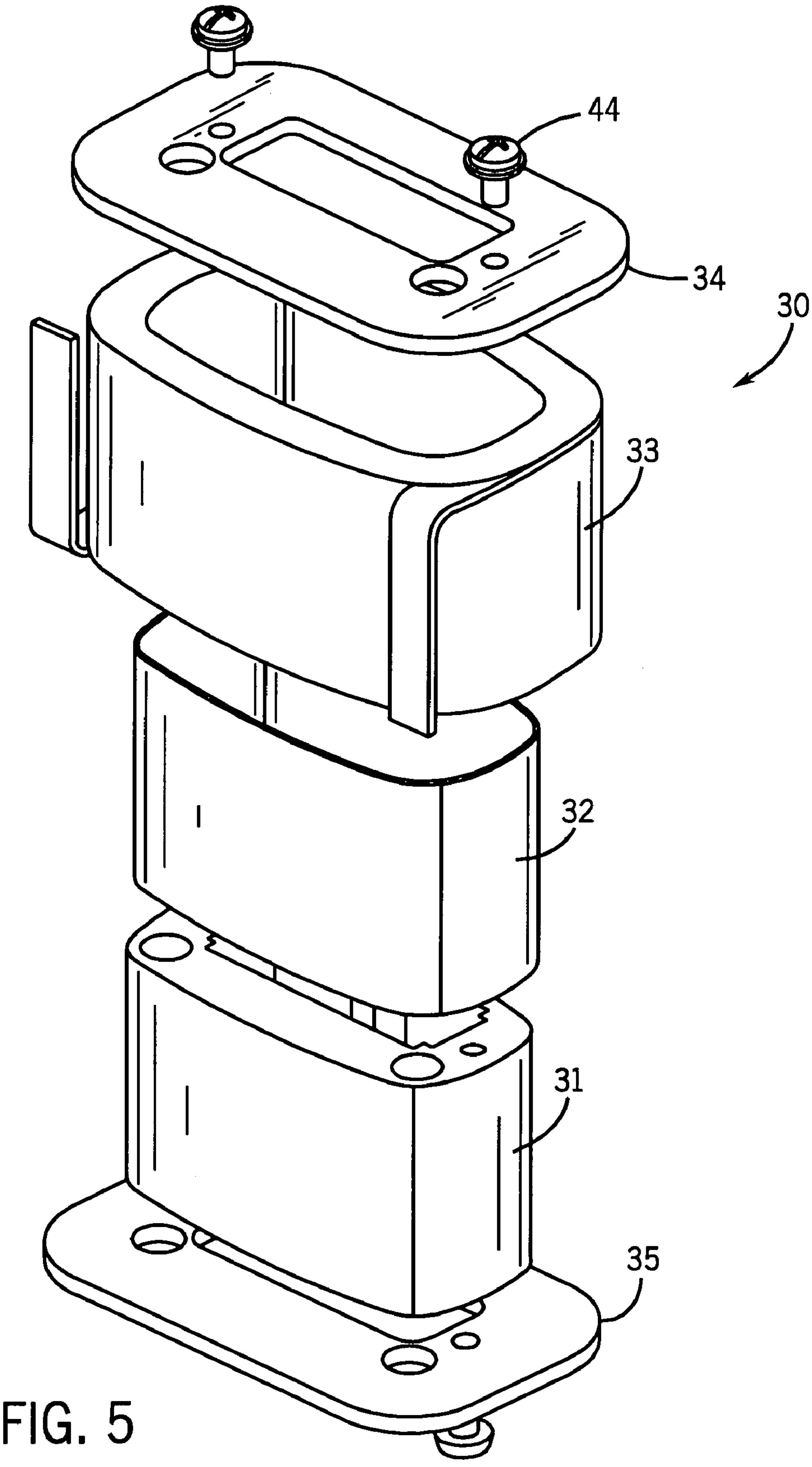
FIG. 5 is an exploded view of the bobbin assembly of FIG. 4.

As further seen in FIGS. 1–3, the choke coil assembly 11 has two coil assemblies 28, 29 disposed on the outside legs 41, 42, of a three-legged core 40 of ferromagnetic material. As seen in FIG. 5, each coil assembly 28, 29 includes a bobbin assembly 30 having a bobbin core 31, a hollow bobbin 32 that fits over the bobbin core 31, a coil 33 of multiple turns of an insulated conductor that fits over the bobbin 32 and a pair of end caps 34, 35. The bobbin core 31 in this instance is C-shaped with two end portions separated by a gap (in this case, an air gap) to prevent a complete circuit in which a current could be induced to provide what is referred to a "shorting turn." The bobbin core is metallic, preferably aluminum, which is a conductor, but is not a ferromagnetic material. The bobbin 32 and the end caps 34, 35 are made of a synthetic, dielectric material, again so as not to allow a current to be induced in them to cause a "shorted turn." They are fastened to the bobbin core 31 using suitable fasteners 44. As seen in FIG. 4, two holes 36, 37 are provided at opposite outside corners of the central opening of the bobbin core. Liners 38, 39 can be inserted in each hole 36, 37. These holes 36, 37 can accept various types of tubes for cooling systems as described herein. The holes 36, 37 are oriented parallel to an axis through the central opening of the bobbin core 31 and normal to the turns of the coil 33, so as not to have a current induced in them.

Figure 6:
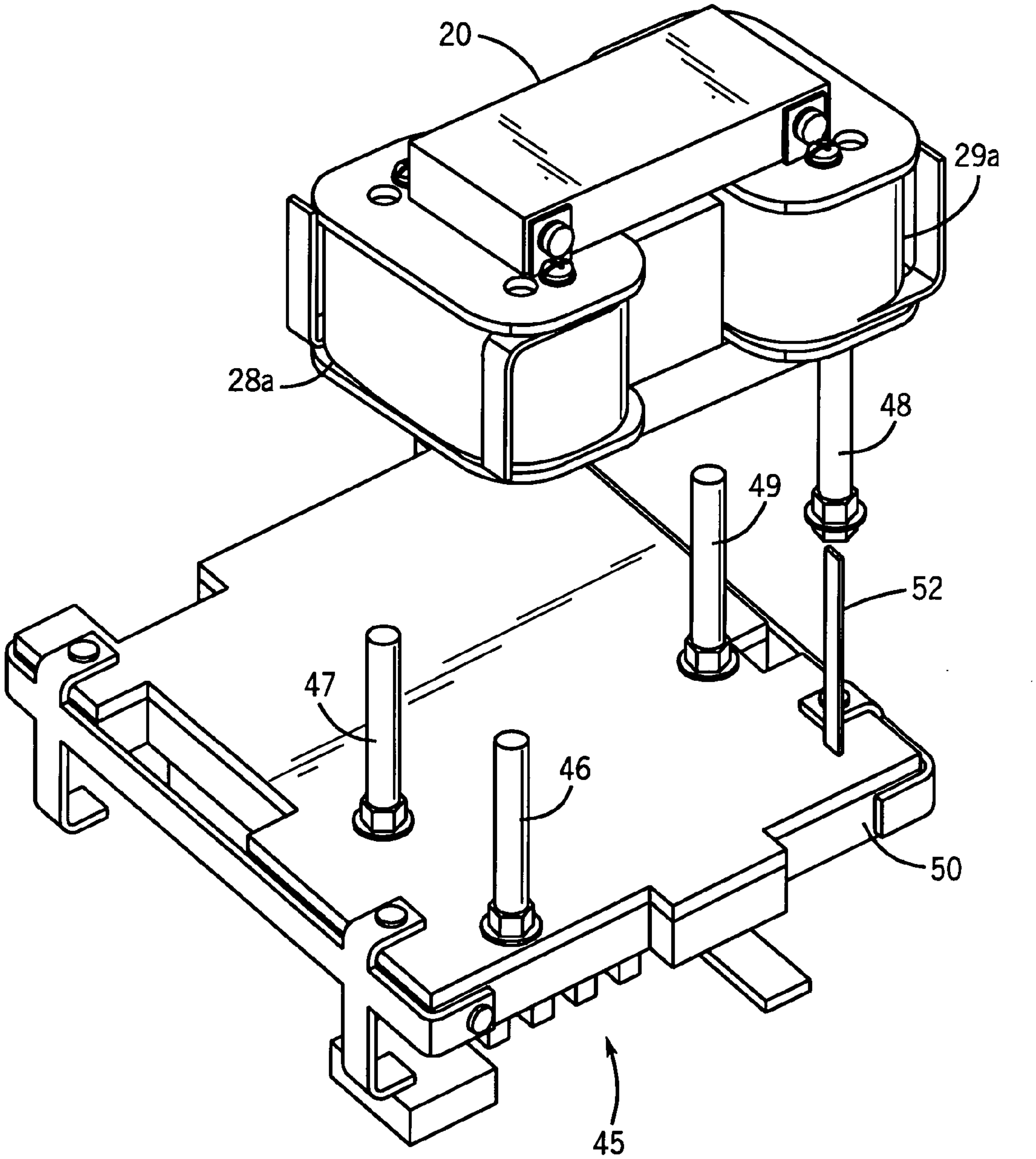
FIG. 6 is a perspective assembly view an inductor assembly using bobbins of the present invention and using a cooling system with closed-end tubes.
Figure 7:
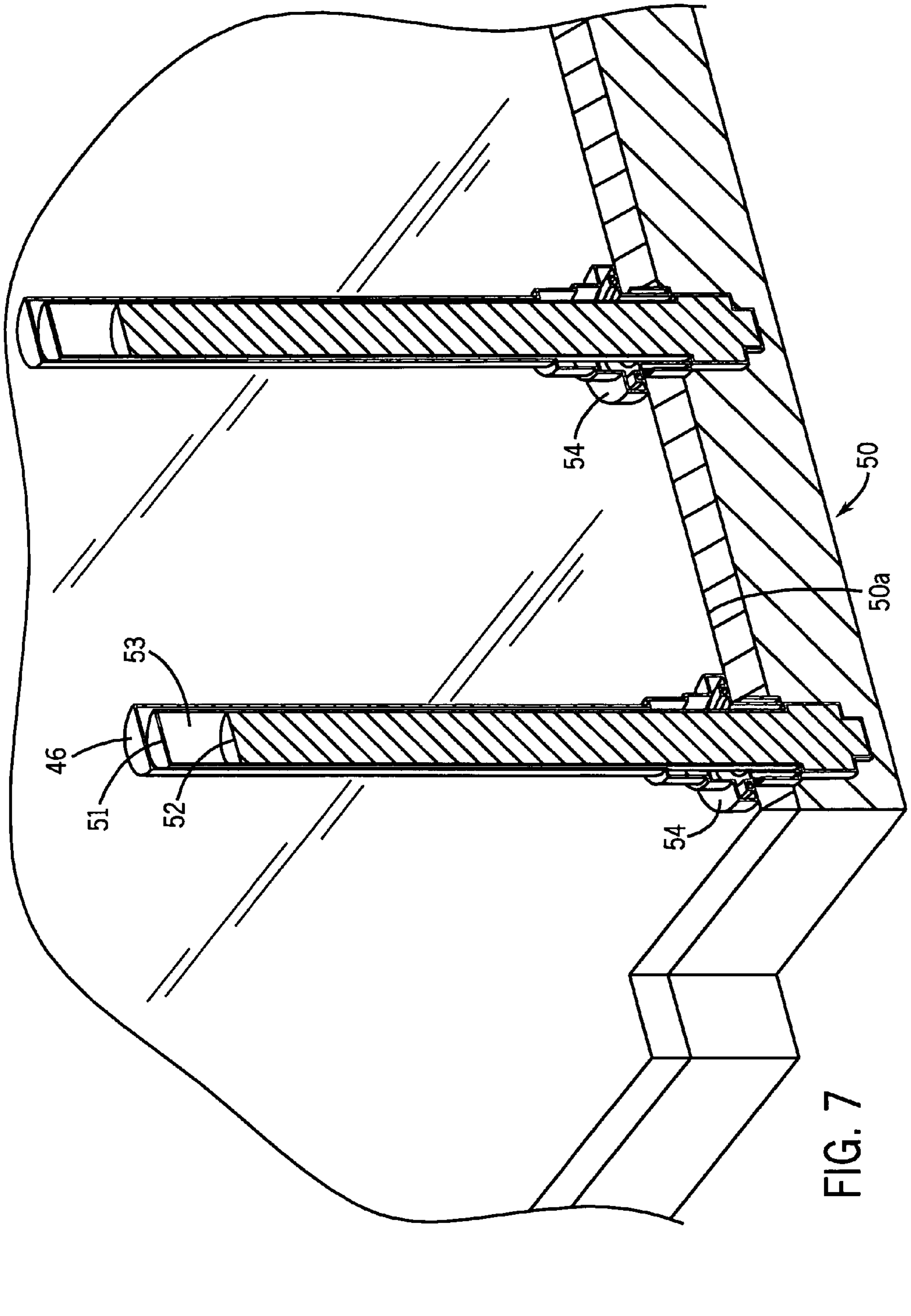
FIG. 7 is a detail sectional view of a cooling tube portion of the assembly of FIG. 6.
Figure 8:
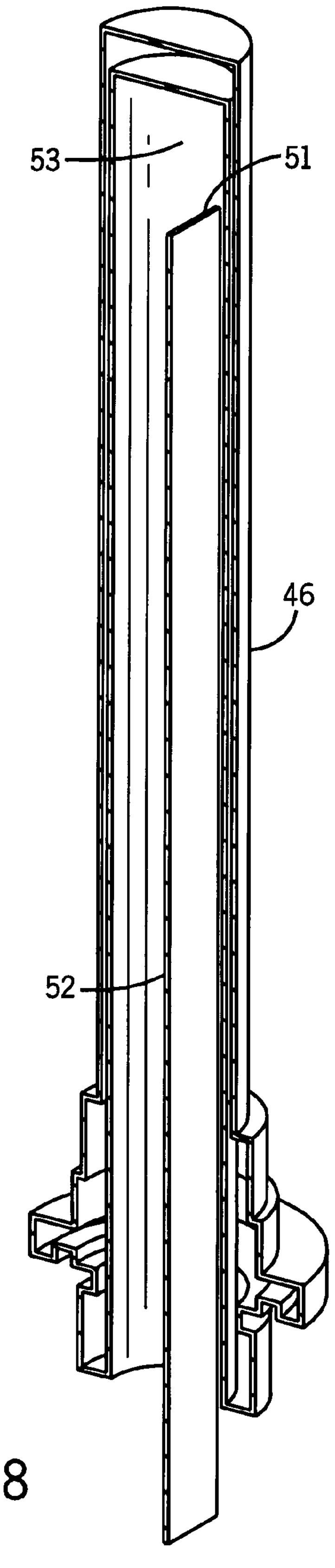
FIG. 8 is detail sectional view of the cooling tube of FIG. 7 taken in a plane that is orthogonal to the section in FIG. 7.

FIG. 6 shows a second embodiment of the inductor assembly in which the inductor assembly 10, including coil assemblies 28*a* and 29*a* and three-legged magnetic core 40*a*, is constructed in the same manner as in FIGS. 1–5, but in which a closed-end cooling assembly 45 is used to provide cooling to the inductor assembly 10. This cooling assembly 45 includes four closed-end tubes 46, 47, 48, 49, rising from a base plate-cooling manifold 50. These tubes 46, 47, 48, 49 have ends for attachment to the base plate-cooling manifold 50, either by threaded connections or by welding. A closed-end tube 46 (a tube with one closed end), as seen in FIGS. 6 and 7, is inserted from underneath the top surface 50*a* of the base plate 50 into the core of an electrical component 28*a*, 29*a*. The tube 46 has a base portion 54 for mounting to the top plate 50*a*. The two light vertical lines in FIG. 7 define a sectioned wall of the tube 46. Each closed-end tube 46 has a partition member 52 that splits the flow into two portions with the split flow communicating through an internal lateral passageway 53 above the partition 52 and near an upper end of the tube 51. Although the flow is divided in this way, it can be divided in other ways, with a concentric type of divider for example, as explained in more detail in a U.S. patent application entitled "Cooling of Electrical Components with Closed-End Split-Flow Devices," which is assigned to the assignee herein and filed on even date herewith. Although the tubes herein are shown as cylindrical, as used herein the term "tubes" should be understood to have other possible cross-sectional shapes such as rectangular.

Figure 9:
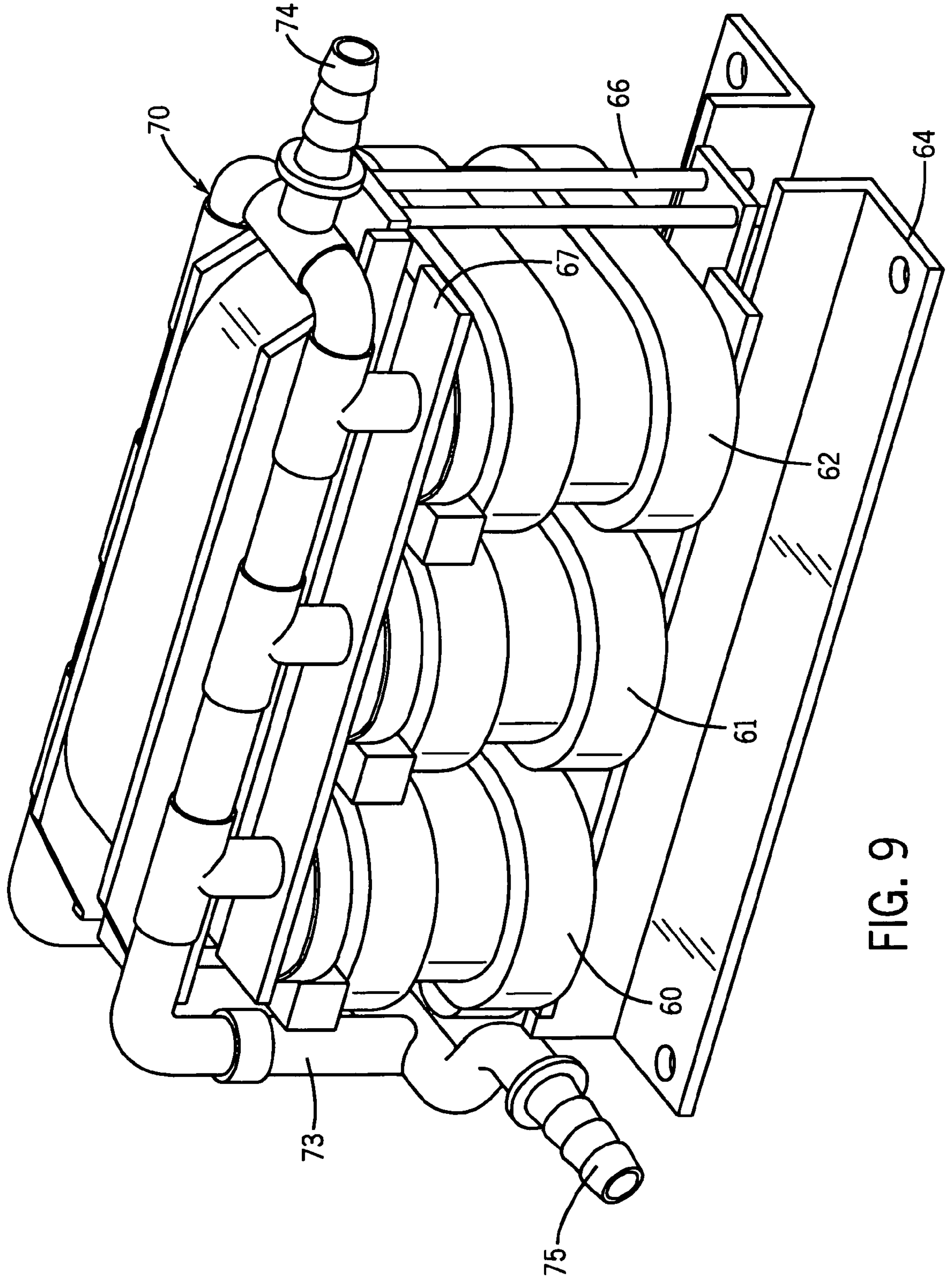
FIG. 9 is a perspective view of a second type of inductor assembly of the present invention.
Figure 10:
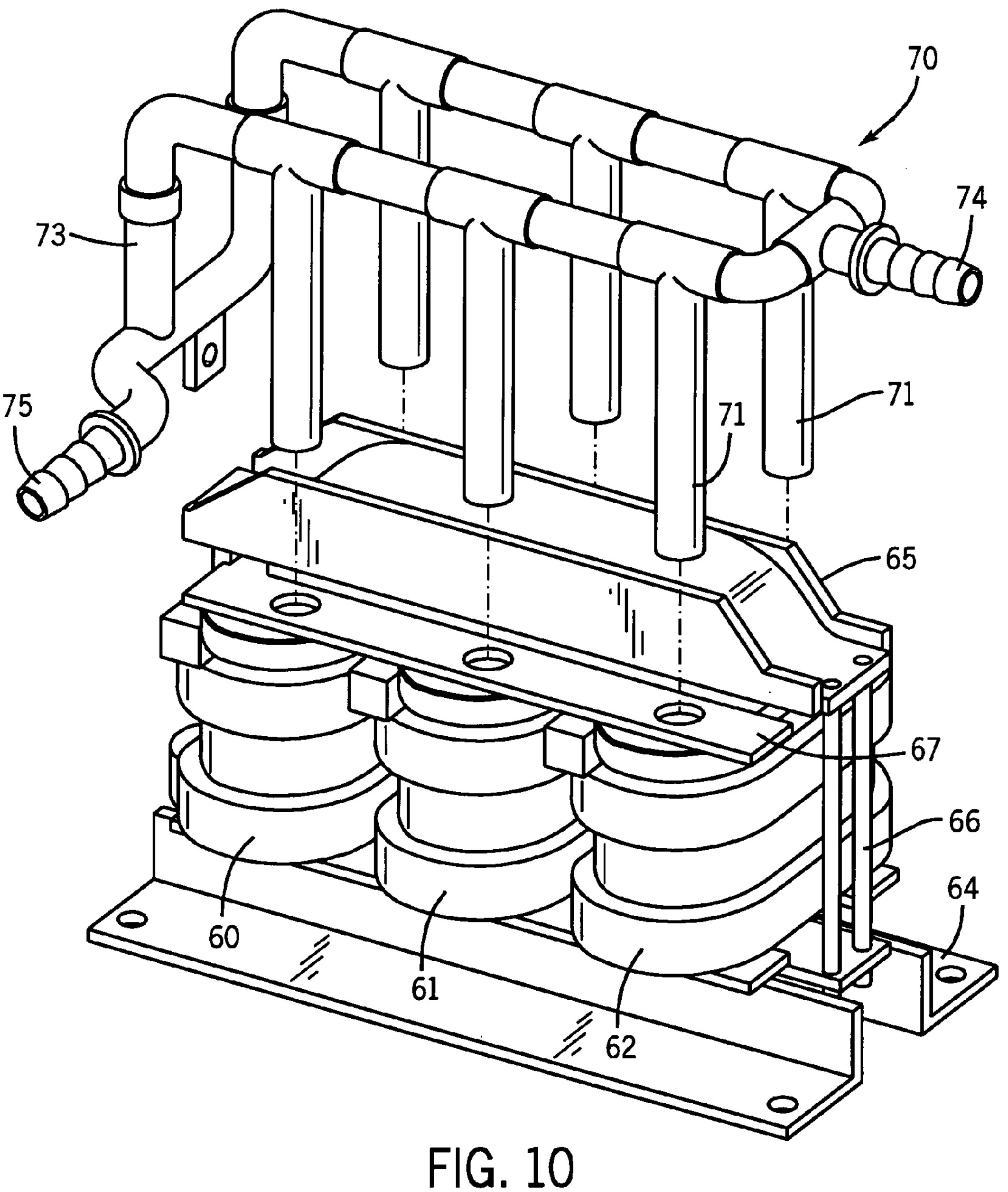
FIG. 10 is a partially exploded perspective view of the assembly of FIG. 9.
Figure 11:
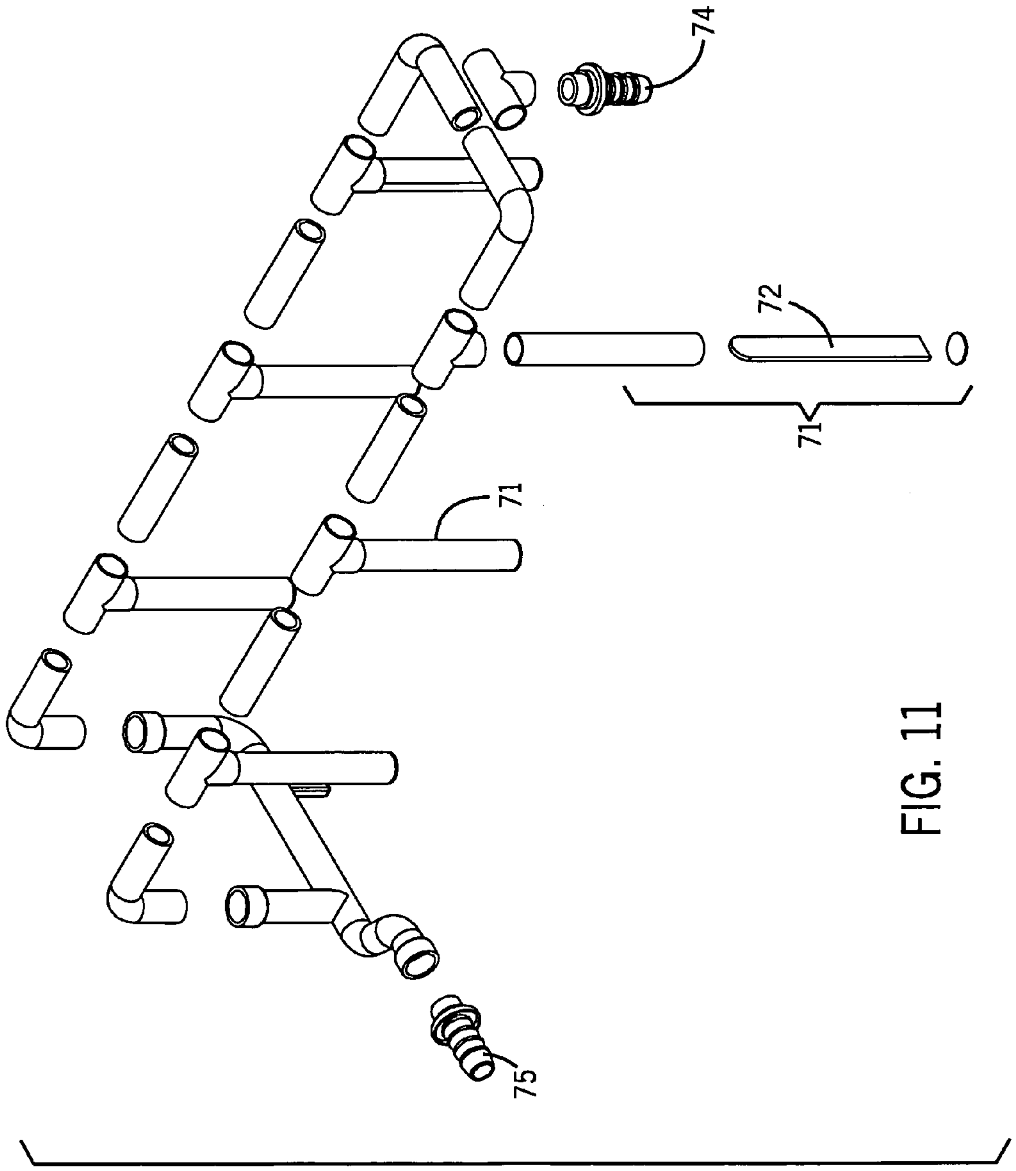
FIG. 11 is a detail view of portion of a subassembly seen in FIG. 10.

FIGS. 9 and 10 show a construction of the coil assemblies 60, 61 and 62 with closed-end tubes 71 inserted from the top. The conduit assembly 70 has six closed-end tubes 71 with split flow provided by bisecting dividers 72 seen in FIG. 11. A non-planar loop conduit 73 is provided to supply and return fluid between inlet 74 and outlet 75. The coil assemblies 60, 61 and 62 are supported on a base plate 64 and held in place with a bracket 65 and long bolts 66. A retaining member 67 with six holes is disposed over holes in the coil assemblies 60, 61 and 62 to receive the closed-end tubes 71.

Figure 12:
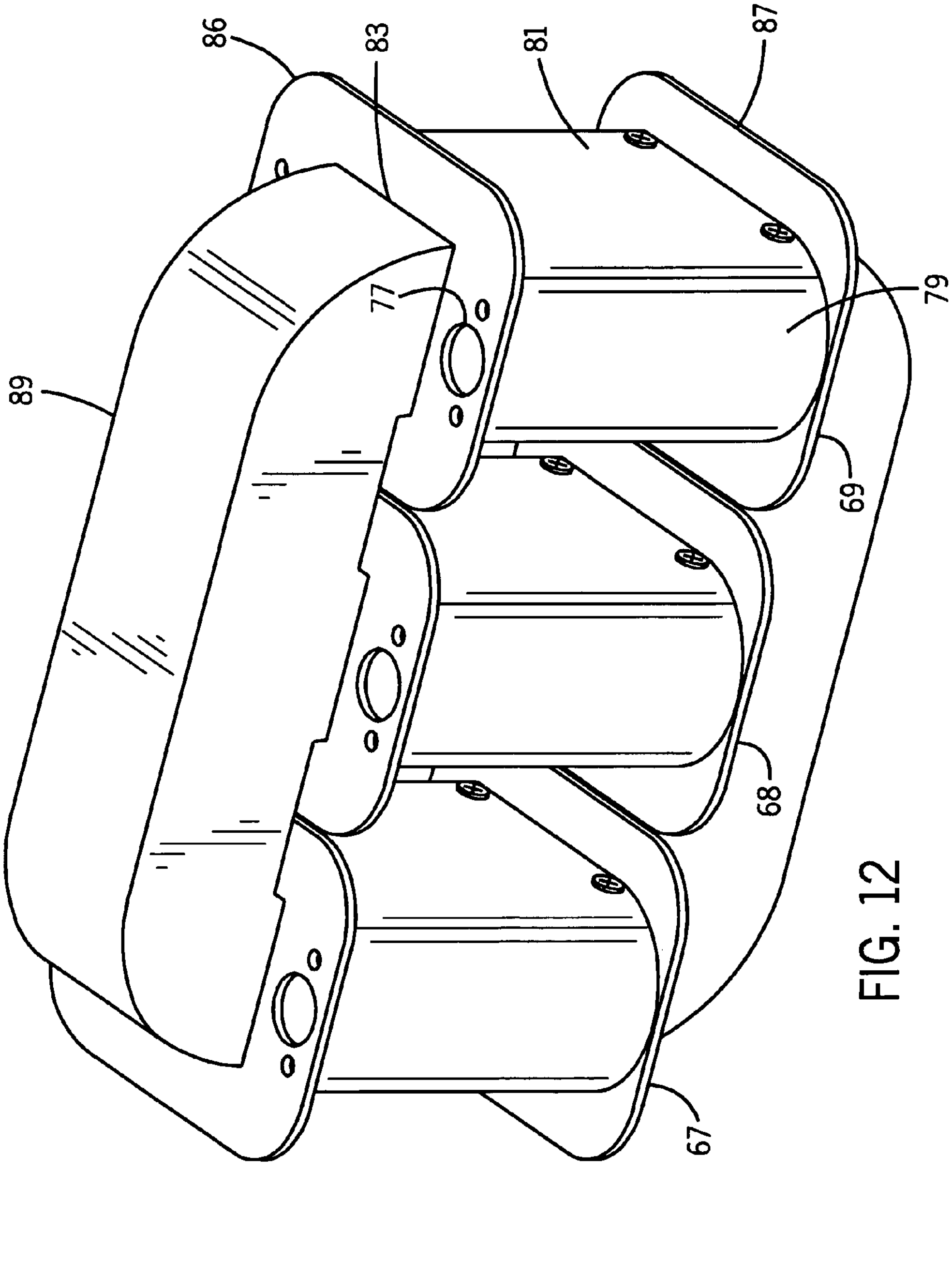
FIG. 12 is a detail perspective view of another subassembly seen in FIG. 10.
Figure 13:
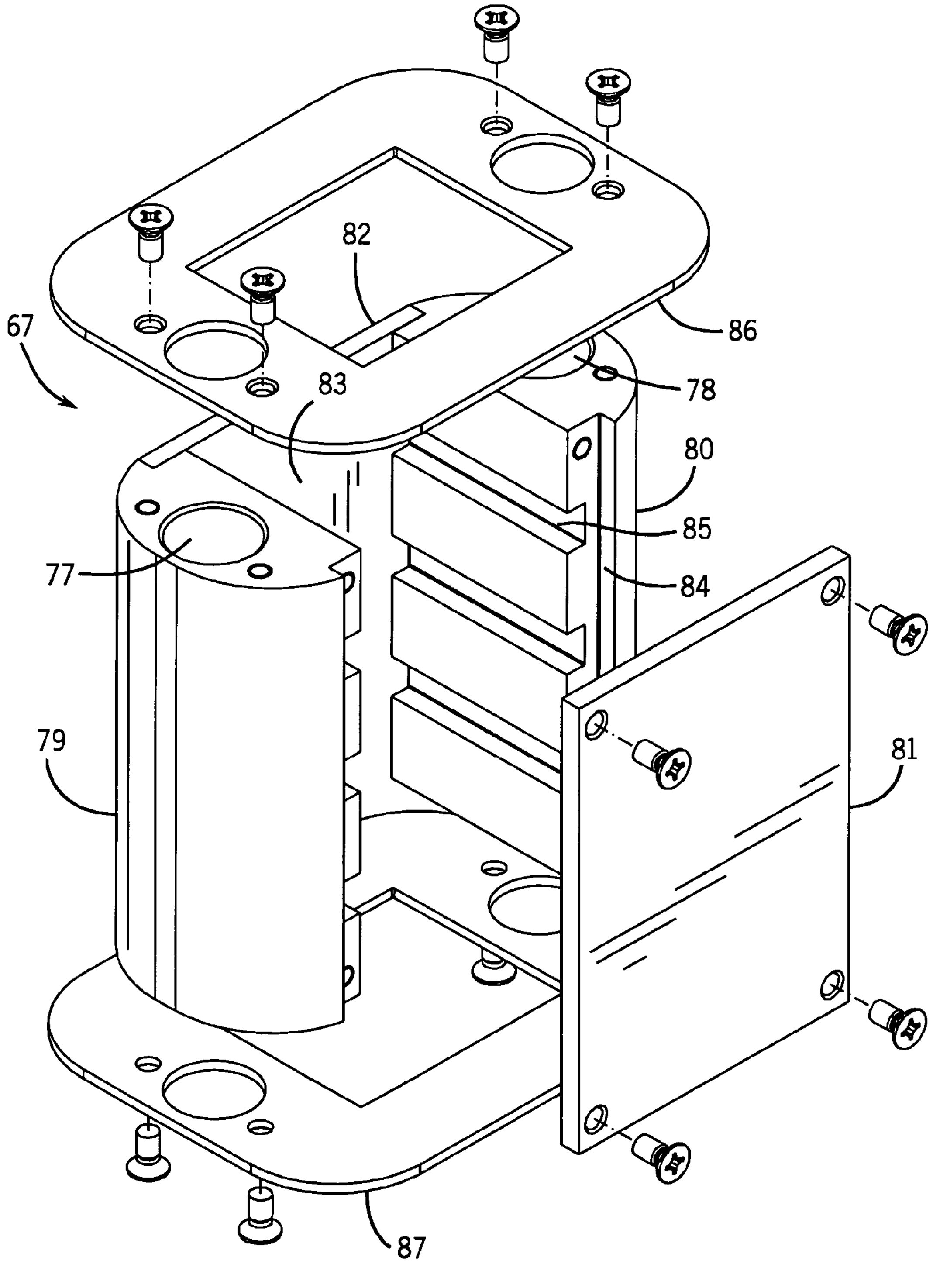
FIG. 13 is a detail exploded view of one of another bobbin assemblies of FIG. 12.

FIGS. 12 and 13 show the bobbin assembly with the coils removed. Each bobbin assembly 67, 68, 69 has passageways 77, 78 passing through it parallel to a central axis for the bobbin and along a plane of symmetry from front to back of the bobbin assembly. As seen in FIG. 13, the bobbin assembly 67 has two bobbin end pieces 79, 80 of conducting, but non-ferromagnetic material such as aluminum, spaced apart by planar spacer members 81, 82 of dielectric material as well as by a central cavity 83. The edges of the planar spacer members 81, 82 fit in grooves 84 formed in the end pieces 79, 80. The end pieces 79, 80 have transverse grooves 85 formed in them to reduce fringing effects. End caps 86, 87 of dielectric material are attached to opposite ends. One leg of the ferromagnetic core 89 would extend through the central cavity 83 of each bobbin assembly.

Figure 14:
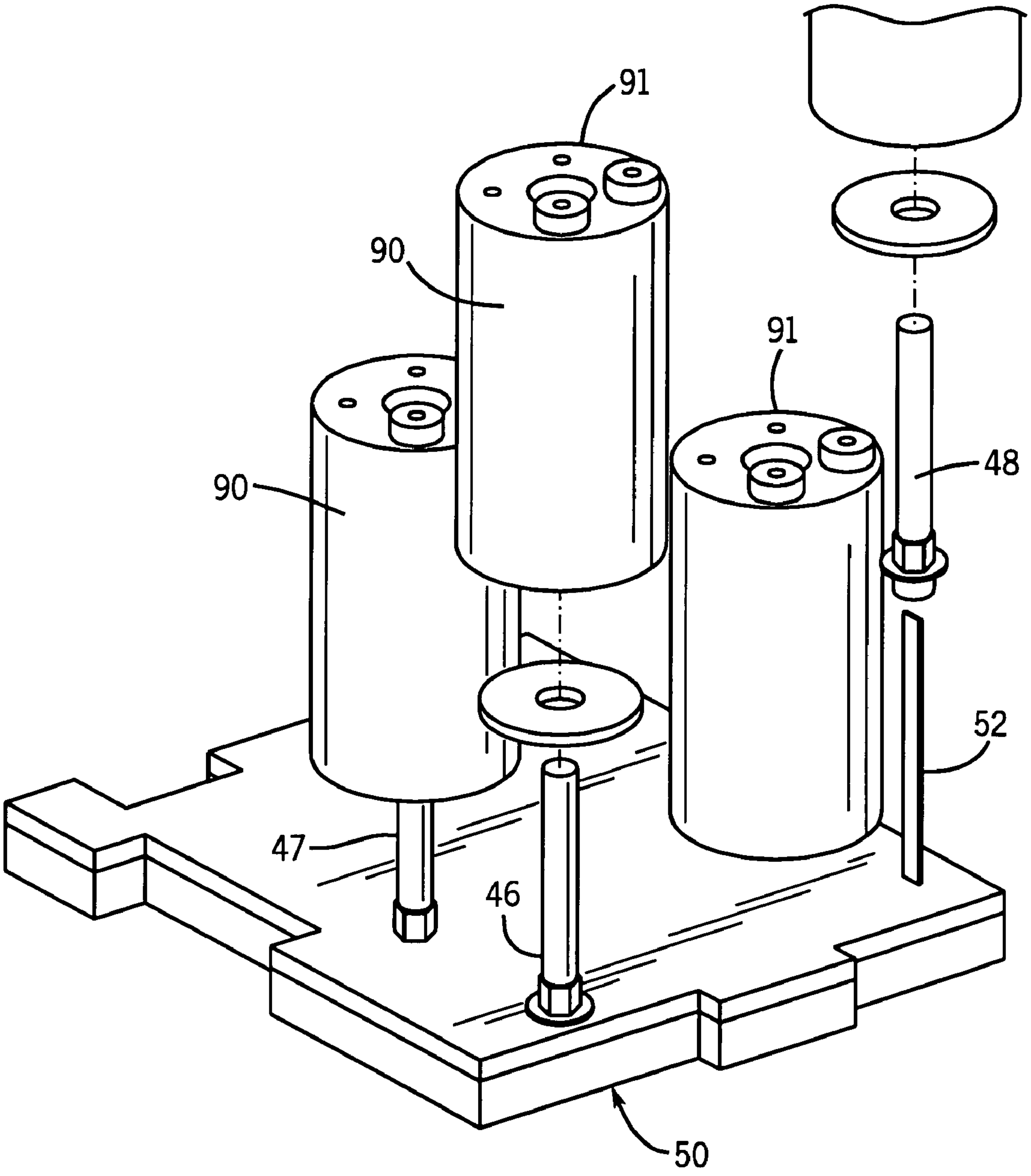
FIG. 14 shows a cooling assembly of FIGS. 6 and 7 used to cool capacitive components.

FIG. 14 shows a cooling base plate assembly 50 as seen in FIG. 1 for cooling capacitors 90. The closed-end tubes 46-49 therein extend into the cores of the capacitors 90. This capacitor core is made of non-magnetic material and an annular member of dielectric material is disposed around the capacitor core. A pair of end pieces of dielectric material 91 are disposed on opposite ends of the capacitor 90. There is at least one hole formed in one of the end pieces 91 and passing into the core in a direction normal to the electrical component. This hole accepts a tube 48 for a cooling medium for circulating the cooling medium within the core to cool the capacitor 90. Other tubes 46, 47 can be received in other capacitors as shown in FIG. 14.

Thus, the principles of the present invention may be applied to other electrical components besides inductors. Also, heat pipes can be used instead of the closed-end tubes. In heat pipes, the fluid is often aided by wicking action of a wicking medium and a liquid often changes phase between liquid and a vapor.

This has been a description of several preferred embodiments of the invention. It will be apparent that various modifications and details can be varied without departing from the scope and spirit of the invention, and these are intended to come within the scope of the following claims.

We claim:

1. A bobbin assembly for an electrical component, the bobbin assembly having:

- a bobbin core of non-magnetic, conductive material having a central opening therethrough and having two portions spaced apart to form a non-conducting portion therebetween;
- a bobbin member disposed over the core, the bobbin member being made of a dielectric material;
- an electrical component including a coil having a plurality of turns disposed over the bobbin member;
- a pair of end pieces of dielectric material disposed on opposite ends of the bobbin core and extending parallel to the plurality of turns; and
- wherein at least one hole is formed in said end pieces and said bobbin core, the hole passing through the core in a direction normal to the plurality of turns, said hole being adapted to accept a tube for a cooling medium and for circulating the cooling medium within the bobbin core to cool the electrical component.

2. The bobbin assembly of claim 1, wherein the electrical component is an inductor disposed around said bobbin member.

3. The bobbin assembly of claim 1, wherein the spaced apart portions prevent a complete circuit in which a current could be induced in any plane normal to the plurality of turns and wherein the non-conducting portion between the two portions of the bobbin core is an air gap.

4. The bobbin assembly of claim 1, wherein the spaced apart portions prevent a complete circuit in which a current could be induced in any plane normal to the plurality of turns and wherein the non-conducting portion between the two portions of the bobbin core is provided at least in part by a dielectric material.

5. The bobbin assembly of claim 1, wherein the bobbin core is formed of aluminum.

6. The bobbin assembly of claim 1, wherein the holes are formed in said end pieces and in said bobbin core and are disposed nearer to two corners of the bobbin core than to two opposite corners of the bobbin core.

7. The bobbin assembly of claim 1, wherein the holes are formed in said end pieces and said bobbin core and are disposed along a plane of symmetry running from front to back through the bobbin assembly.

8. The bobbin assembly of claim 1, in combination with a conduit assembly including pass-through conduits for conveying a cooling medium through the holes from an inlet to an outlet.

9. The combination of claim 8, wherein the conduit assembly forms a loop that lies in more than one plane.

10. The bobbin assembly of claim 1, in combination with a conduit assembly including closed-end tubes for conveying a cooling medium into and out of the tubes to provide a split flow.

11. The combination of claim 10, wherein said closed-end tubes have a partition therein for dividing an interior of the tube into an inflow portion and an outflow portion.

12. An inductor assembly for receiving cooling components, the inductor assembly comprising:

- a pair of coil assemblies, each having an opening therethrough;
- a magnetic core having legs for passing through respective openings in the coil assemblies;
- wherein the coil assemblies each include
- a bobbin core of non-magnetic material having a central opening therethrough and having two portions spaced apart to form a non-conductive part therebetween;
- a bobbin member disposed over the core, said bobbin member being made of a dielectric material;
- an electrical component including a coil having a plurality of turns disposed over the bobbin member;
- a pair of end pieces of dielectric material disposed on opposite ends of the bobbin and extending parallel to the plurality of turns; and
- a pair of holes formed in said end pieces and extending into said bobbin core in a direction normal to the plurality of turns, said holes being adapted to accept tubes for a cooling medium and for circulating the cooling medium within the bobbin core to cool the electrical component.

13. The inductor assembly of claim 12, in combination with a conduit assembly including pass-through conduits for conveying a cooling medium through the holes from an inlet to an outlet of the holes.

14. The combination of claim 13, wherein the conduit assembly forms a loop that lies in more than one plane.

15. The bobbin assembly of claim 12, in combination with a conduit assembly including closed-end tubes for conveying a cooling medium into and out of the holes to provide a split flow.

16. The combination of claim 15, wherein said closed-end tubes have a partition therein for bisecting an interior of the tube into an inflow portion and an outflow portion.

* * * * *